Aug. 27, 1929.  E. C. BECK  1,726,207

TRANSPLANTING TOOL

Filed May 29, 1928

Edward C. Beck  Inventor

By Herbert E. Smith
Attorney

Patented Aug. 27, 1929.

1,726,207

UNITED STATES PATENT OFFICE.

EDWARD C. BECK, OF SPOKANE, WASHINGTON.

TRANSPLANTING TOOL.

Application filed May 29, 1928. Serial No. 281,436.

My present invention relates to an improved transplanting tool especially designed for use in hothouses, gardens, and similar places where plants are transplanted. The primary object of the invention is the provision of a hand tool by means of which small plants may be transplanted, as from the bed of a hothouse to the bed in the garden, and in addition to use as a transplanting tool, my implement may be used for digging the soil for cultivating purposes, or for use as a garden trowel in the removal of soil. In carrying out my invention I employ a tool which is adjustable as to size for use in transplanting various sizes of plants, and the parts of the tool are separable in order that said parts may be used for various purposes.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have so far devised for the practical application of the principles of my invention.

Figure 1:
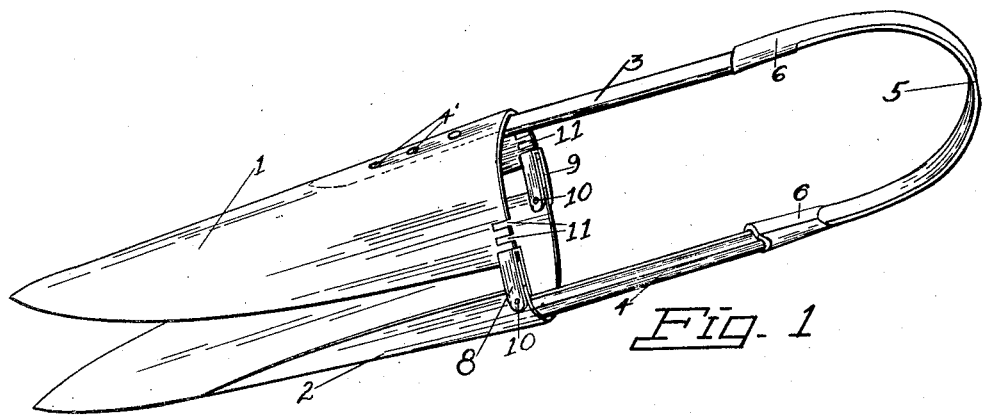
Figure 2:
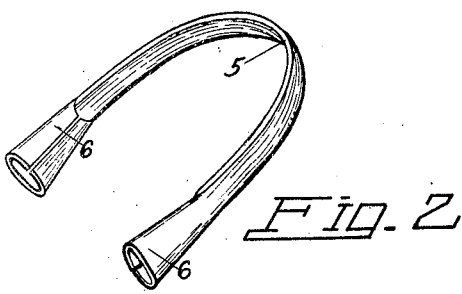
Figure 3:
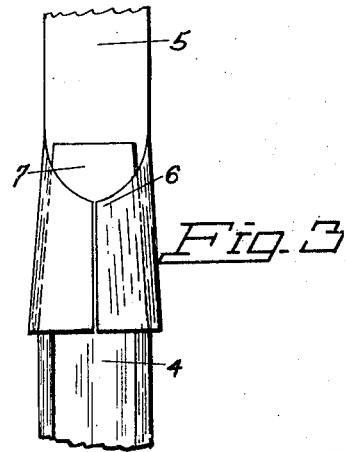
Figure 4:
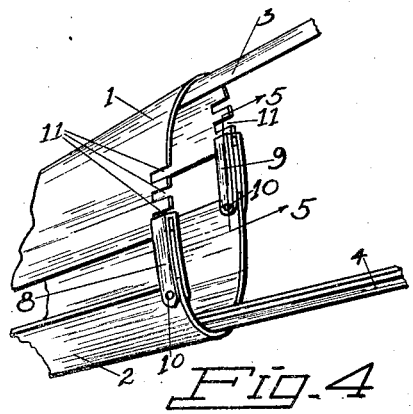
Figure 5:
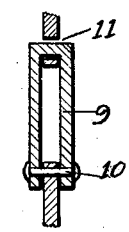

Figure 1 is a perspective view of the transplanting tool. Figure 2 is a perspective view of the resilient bow shaped handle detached. Figure 3 is an enlarged detail view showing the connection between the handle and a shank of the tool. Figure 4 is a perspective detail view showing the adjustment of the blades of the tool. Figure 5 is an enlarged detail sectional view at line 5—5 of Figure 4.

In carrying out my invention I employ a pair of complementary blades 1 and 2 preferably fashioned from sheet steel and curved as indicated. These blades taper toward their points and provide a transplanting tool, or when separated the blades may be used as spades for digging the soil, or as garden trowels for the removal of soil. Each blade is fashioned with a shank as 3 and 4 and the shanks are rigidly attached to the blades as by rivets 4' in Figure 1.

In connection with the shanks 3 and 4 I utilize a removable bowed handle 5 of resilient metal which forms a spring tending to separate the blades. This spring handle is provided with a pair of tapered end sockets 6 which are fashioned integral with the bowed handle 5. The sockets 6 are adapted to slip over the complementary tapered socket ends 7 of the shanks 3 and 4 and the handle is secured on the shanks by friction between the sockets and the socket ends. The tool is grasped in the hand and of course, the hand may encompass not only the socket ends of the bowed handle, but also the shanks 3 and 4.

The two curved blades 1 and 2 may be locked together in adjusted position by means of a pair of locking yokes or loops 8 and 9 each of which is pivoted at 10 to a blade, and the yokes are adapted to engage a selected one of a series of notches 11 on the opposite blade. Thus if the plant to be removed is of the minimum size, the yokes are fitted in the remotest notch, while if the tool is to be used for its maximum capacity the yokes are fitted into the nearest notches as indicated in Figure 1. For use as a transplanting tool the implement as indicated in Figure 1 is inserted in the soil around the plant and the plant with its surrounding soil is removed from the bed. Then for the purpose of replanting the plant the tapered shaped points of the blades with the contained plant are inserted in the flower bed together with the plant and its surrounding soil. The plant is retained between the blades by pressure on the handle portion of the tool and, of course, when this pressure is released, and the tool withdrawn from the bed, the plant with its soil remains in the bed and the soil may be tamped in the usual manner to provide support for the transplanted plant. The tool may thus be used for various purposes in transplanting various sizes of plants, and many successful operations have already been performed with tools embodying my invention.

In addition to use as a transplanting tool, various other functions may be performed, as for instance with the bowed handle 5 removed and the yokes disconnected, the blades may be used as spades or trowels. Thus the shank 3 or the shank 4 may be used as a handle and the blades 1 or 2 may be used for spades in digging the soil or cultivating the soil around a plant, or the blades may be used as garden or hothouse trowels.

The handle 5 may readily be removed from the shanks and, of course, the yokes may with facility be disconnected from the blades.

Having thus fully described my invention, what I claim as new and desire to secure by Letters Patent is:—

The combination with a pair of curved tapered blades having rigid shanks, of a bowed resilient detachable handle having a pair of end sockets to engage said shanks, and a pair of pivoted yokes adapted to engage selected notches on said blades.

In testimony whereof I affix my signature.

EDWARD C. BECK.